United States Patent [19]
Shetterly

[11] Patent Number: 5,717,164
[45] Date of Patent: Feb. 10, 1998

[54] ELECTRICAL OUTLET BOX ASSEMBLY

[76] Inventor: Frederick A. Shetterly, 1303 Specktown Rd., Gratz, Pa. 17030

[21] Appl. No.: 445,890

[22] Filed: May 22, 1995

[51] Int. Cl.⁶ ................................................ H02G 3/08
[52] U.S. Cl. .................................... 174/58; 220/3.3
[58] Field of Search ........................ 174/50, 48, 65 R, 174/53, 57, 58; 220/3.3, 3.7

[56] References Cited

U.S. PATENT DOCUMENTS

| | | | |
|---|---|---|---|
| 3,141,062 | 7/1964 | Rapata | 174/153 |
| 3,676,571 | 7/1972 | Rubinstein | 174/65 R |
| 4,385,504 | 5/1983 | Perrone | 62/259 |
| 4,390,105 | 6/1983 | Graves | 220/3.6 |
| 4,612,412 | 9/1986 | Johnston | 174/65 R |
| 4,724,281 | 2/1988 | Nix et al. | 175/53 |
| 4,821,904 | 4/1989 | Bhargava et al. | 220/3.2 |
| 5,012,043 | 4/1991 | Seymour | 174/57 |

*Primary Examiner*—Hyung S. Sough
*Assistant Examiner*—Dhiru R. Patel
*Attorney, Agent, or Firm*—Henry S. Miller

[57] ABSTRACT

An electrical outlet box assembly has a first outlet box section and a second outlet box section intimately connected to the first outlet box section. A forward end of the second outlet box section has a height less than the height of a rearward end. A first wire port is in a second outlet top wall of the second outlet box section. A second wire port is in a second outlet bottom wall of the second outlet box section. A first wire clamping member has a first section slidingly connected to the second outlet top wall of the second outlet box section and partially slides over the first wire port. A second section is connected to the second outlet top wall of the second outlet box section and opposes the first section. There is a threaded member to move the first section toward the second section and releasably secure a wire between the first section and the second section. A second wire clamping member has a first section slidingly connected to the second outlet bottom wall of the second outlet box section and partially sliding over the second wire port. A second section is connected to the second outlet bottom wall of the second outlet box section and opposing the first section and there is a threaded member to move the first section toward the second section and releasably secure another wire between the first section and the second section. A grounding member is in the second outlet box section and there is assembly insertion indicia on an outside surface of the first outlet box section.

4 Claims, 3 Drawing Sheets

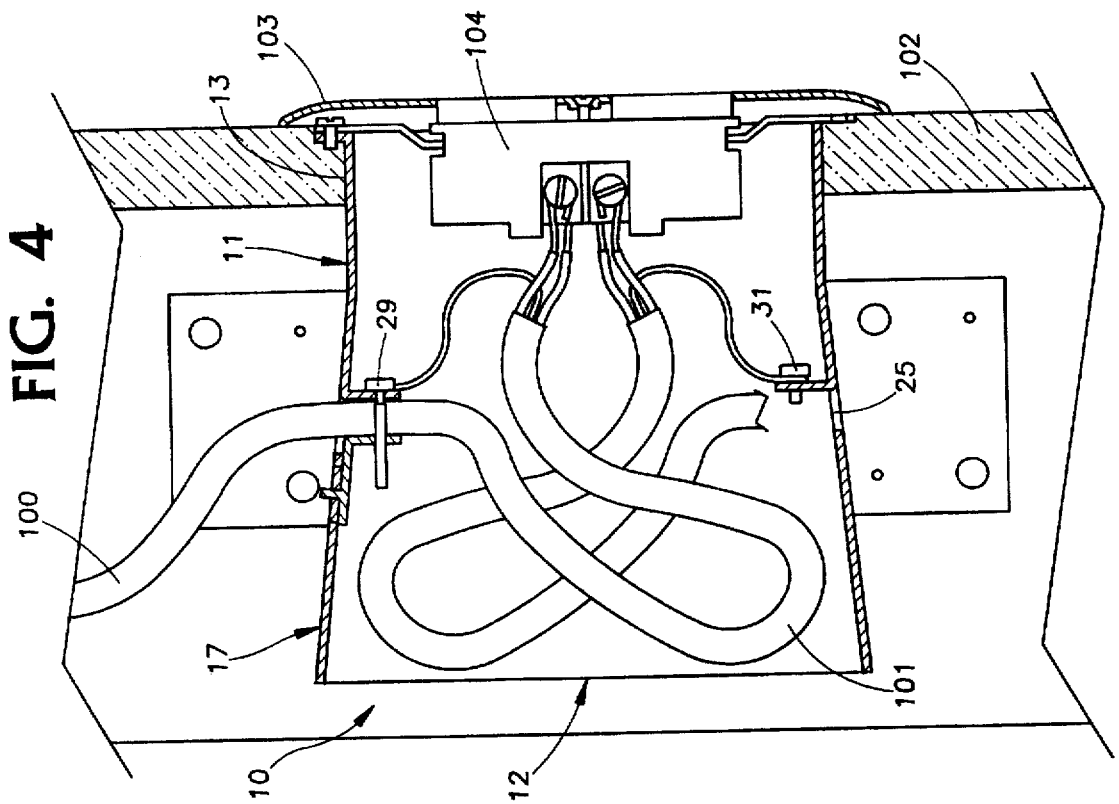

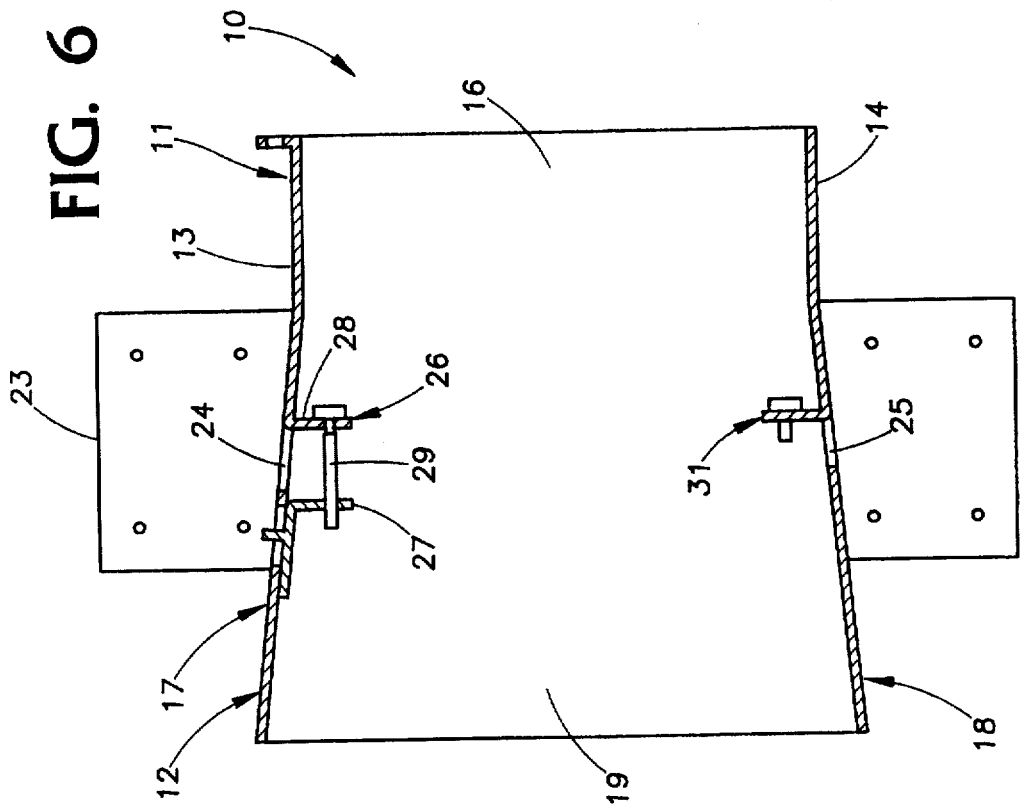
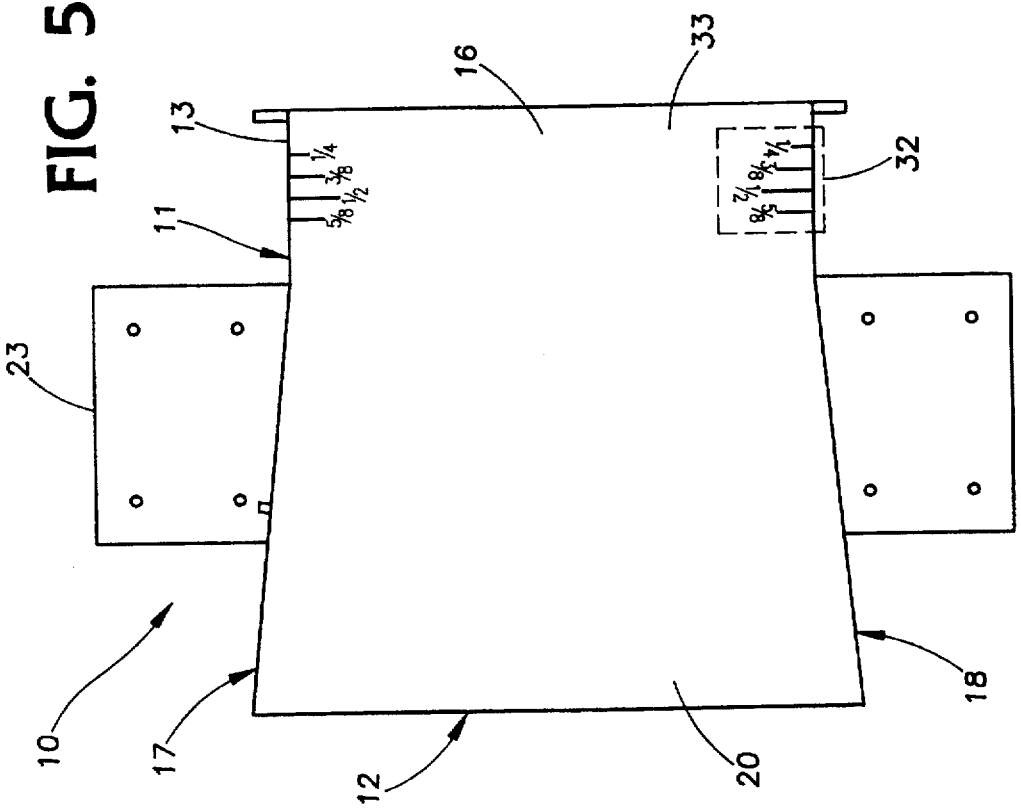

ELECTRICAL OUTLET BOX ASSEMBLY

BACKGROUND OF THE INVENTION

1. Field of the Invention

This invention relates, in general, to an electrical outlet box and, in particular, to an electrical outlet box assembly having improved wire securing and wire storage features.

2. Description of the Related Art

Previous electrical outlet boxes always presented the problem of how to safely store the excess wire that must be drawn out from between the walls to secure the wires to a socket or to join the wires for a common purpose. Stuffing the excess wires back into the box when the wires had electricity flowing through them presented a chance that a person could get shocked or electrocuted. Prior boxes also made grounding the box difficult. Also the prior boxes offered no way to stabilize the position of the wires entering the box if the box were pulled from the wall.

U.S. Pat. No. 4,390,105 to H. K. Graves on Jun. 28, 1983 for an Electrical Outlet Box describes a box having a pair of mounting elements that extend out to engage the front face of a wall and a clamping member. There are legs to engage the walls.

U.S. Pat. No. 4,612,412 to J. J. Johnston on Sep. 16, 1986 for an Electrical Outlet Box Assembly shows a box assembly having a plurality of outlet boxes. The boxes may be snapped together. The boxes have a mounting member on which they may be positioned in several preselected positions.

U.S. Pat. No. 4,724,281 to A. L. Nix, et al., on Feb. 09, 1988 for an Electrical Junction or Outlet Box describes a box having a front flange the width of standard sheetrock. There are tubular passageways to insert wires into the interior of the box. The flange and the tubular passageways allow the user to caulk over the flange and passageways to reduce heating loss through the walls.

U.S. Pat. No. 4,821,904 to N. N. Bhargava, et al., on Apr. 18, 1989 for an Electrical Outlet Box with improved Cable Entry Aperture Knockout Panels shows a plastic box having a plurality of webs for attaching a cable entry aperture knockout panels near the corners of a rectangular panel. The panels have a nonslip surface to reduce slippage of an instrument such as a screwdriver when used to knockout the panels.

SUMMARY OF THE INVENTION

The present invention solves the problems encountered in previously provide electrical outlet boxes. The present electrical outlet box assembly has two chambers, one in the first section and one in the second section. The rearward portion of the second section is higher that the forward end which provides additional room at the back of the box assembly to store wires more easily. Also, the wires enter the second section from approximately midway of the top and bottom wars which requires less wire to be stored in the box assembly. The wire clamps have a fixed section and a sliding section so once the wires are in place, the sliding section can clamp the wire between it and the fixed section by tightening a threaded fastener such as a screw which pivots in the sliding section and threads into the fixed section thereby moving the two sections together. There is at least one but preferably two grounding connectors in the interior of the box assembly.

In one aspect of the present invention, an electrical outlet box assembly is described that has a first outlet box section and a second outlet box section intimately connected to the first outlet box section. The first outlet box section has a first outlet top wall, a first outlet bottom wall and a pair of opposing first outlet side walls connecting the first outlet top wall and the first outlet bottom wall. The second outlet box section has a second outlet top wall, a second outlet bottom wall and a pair of opposing second outlet side walls connecting the second outlet top wall and the second outlet bottom wall. There is a wire port in the second outlet top wall of the second outlet box section.

A wire clamping member has a first section slidingly connected to the second outlet top wall of the second outlet box section. The first section partially slides over the wire port. There is a second section connected to the second outlet top wall of the second outlet box section. The second section opposes the first section. There is a means to move the first section toward the second section to releasably secure a wire between the first section and the second section.

A forward end of the second outlet box section may have a height less than the height of a rearward end. A mounting member may be attached to the second outlet section.

In another aspect of the present invention, an electrical outlet box assembly is described that has a first outlet box section and a second outlet box section intimately connected to the first outlet box section. The first outlet box section has a first outlet top wall, a first outlet bottom wall and a pair of opposing first outlet side walls connecting the first outlet top wall and the first outlet bottom wall. The second outlet box section has a second outlet top wall, a second outlet bottom wall and a pair of opposing second outlet side walls connecting the second outlet top wall and the second outlet bottom wall. A forward end of the second outlet box section has a height less than the height of a rearward end. There is a mounting member attached to the second outlet section. There is a wire port in the second outlet top wall of the second outlet box section.

A wire clamping member has a first section slidingly connected to second outlet top wall of the second outlet box section and the first section partially slides over the wire port. The second section connects to the second outlet top wall of the second outlet box section and opposes the first section. There is a means to move the first section toward the second section and releasably secure a wire between the first section and the second section. There is a grounding member in the second outlet box section and there is assembly insertion indicia on an outside surface of the first outlet box section.

It is an object of this invention to provide an electrical outlet box assembly that will be more convenient for the user to wire an electrical outlet socket in a wall and not have to encounter the difficulties of previous boxes in storing excess wire in the box.

BRIEF DESCRIPTION OF THE DRAWINGS

FIG. 3 is a front elevational view.

FIG. 4 is a left side cross-sectional view of the box assembly, installed in a structural wall such as sheetrock, showing the wires secured in the clamping member and the wires connected to an outlet socket and the ground connected to the ground member.

FIG. 5 is a left side elevational view.

FIG. 6 is a left side cross-sectional view.

DESCRIPTION OF THE PREFERRED EMBODIMENT

Figure 1:
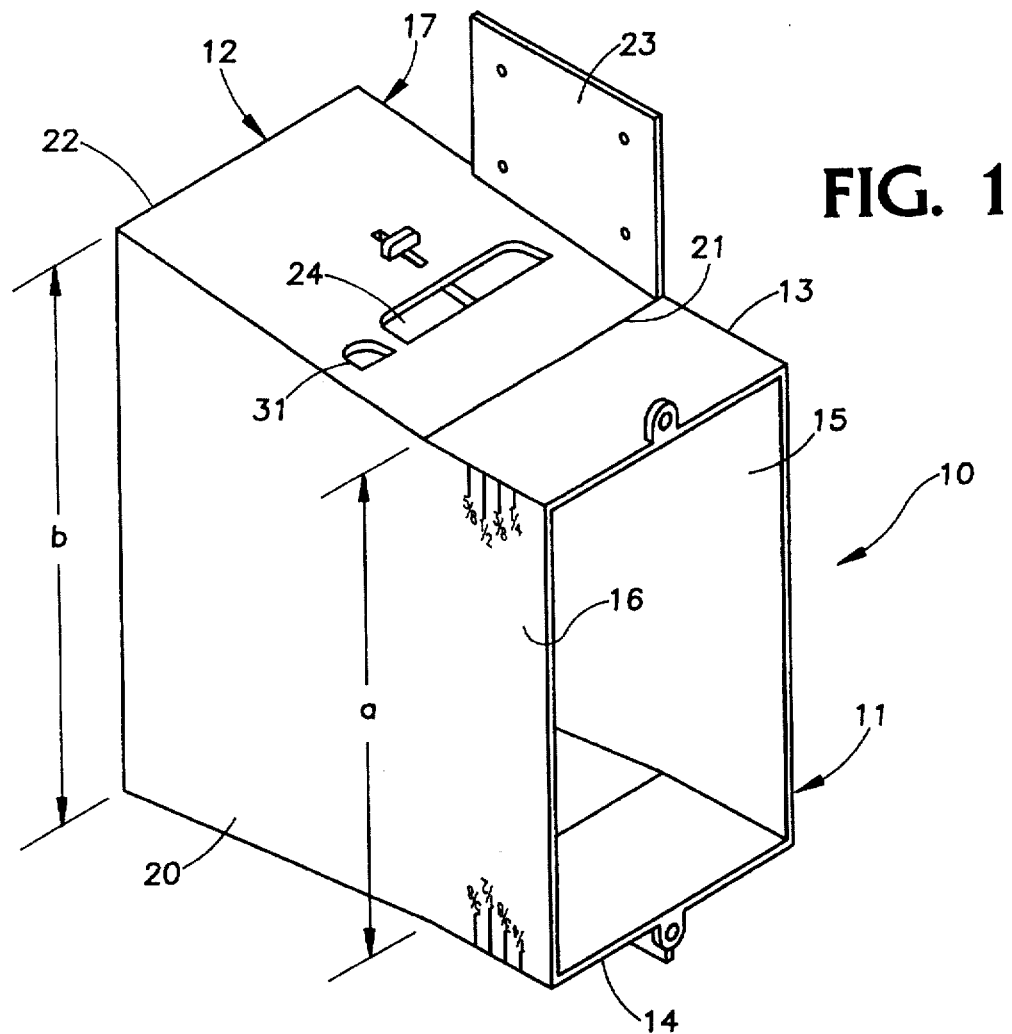
FIG. 1 is a perspective view of the Electrical Outlet Box Assembly.
Figure 2:
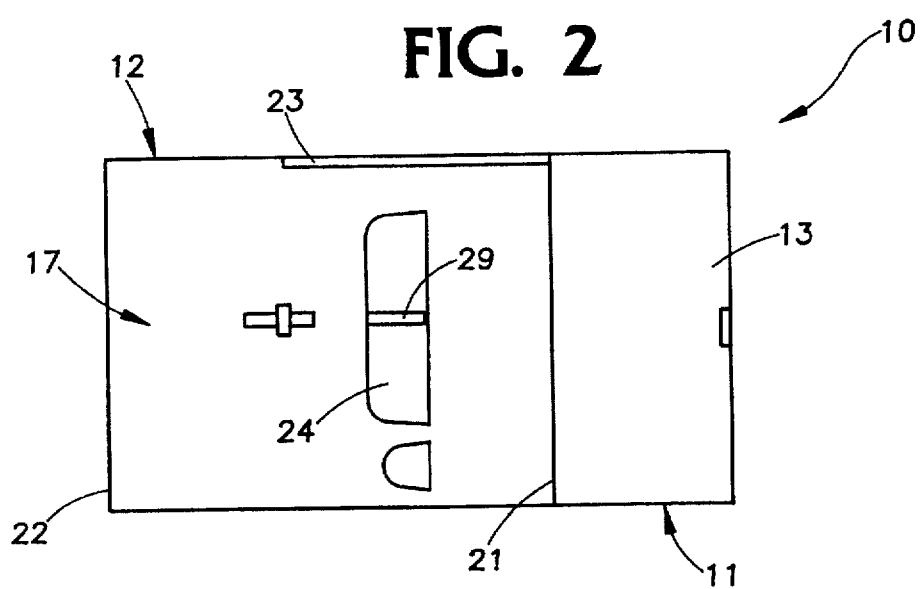
FIG. 2 is top plan view.

Referring to FIGS. 1 through 6, an electrical outlet box assembly 10 is shown and described that has a first outlet box section 11 and a second outlet box section 12 intimately connected to the first outlet box section 11. All the components of the box assembly may be made of metal of a gage similar to other outlet boxes and formed by stamping and folded together and spot welded. The ports may be stamped or cut into the metal. The mounting plate may be of metal and stamped out as part of the two outlet box sections or may be welded onto them. The first outlet box section 11 has a first outlet top wall 13, a first outlet bottom wall 14 and a pair of opposing first outlet side walls 15 and 16 connecting the first outlet top wall 13 and the first outlet bottom wall 14. The second outlet box section 12 has a second outlet top wall 17, a second outlet bottom wall 18 and a pair of opposing second outlet side walls 19 and 20 connecting the second outlet top wall 17 and the second outlet bottom wall 18. There is also a second outlet section back wall connected to the other walls in the second outlet section. A forward end 21 of the second outlet box section 12 has a height (a) less than the height (b) of a rearward end 22. This creates a wire storage chamber in the second outlet box section 12 that is larger that the chamber formed in the first outlet box section 11. The wire storage chamber is also larger toward the end 22 so that more wire may be placed near the end 22. There is a mounting member 23 attached to the second outlet box section 12 and a first wire port 24 in the second outlet top wall 17 of the second outlet box section 12. There is a second wire port 25 in the second outlet bottom wall 18 of the second outlet box section 12. The first and second wire ports may be protected by easily removable knockout inserts (not shown).

A first wire clamping member 26 has a first section 27 slidingly connected to second outlet top wall 17 of the second outlet box section 12 and partially slides over the first wire port 24. A second section 28 is connected to second outlet top wall 17 of the second outlet box section and opposes the first section 27. There is a means 29 (preferably a threaded screw) to move the first section 27 toward the second section 28 and releasably secure a wire 100 between the first section 27 and the second section 28. The threaded screw 29 pivots (near the head of the screw) in the second section 28. The screw 29 threads into the second section 28.

A second wire clamping member 30 (all parts similar to clamping member 26 have the same reference numbers and function the same way) has a first section 27 (not shown) slidingly connected to second outlet bottom wall 18 of the second outlet box section 12 and partially sliding over the second wire port 25. There is a second section 28 (not shown) connected to second outlet bottom wall 18 of the second outlet box section 12 and opposing the first section 27 and there is a means 29 (not shown, preferrably a screw as explained above for means 29) to move the first section 27 toward the second section 28 and releasably secure another wire 101 between the first section 27 and the second section 28. There is at least one and preferably two grounding members 31 in the second outlet box section 12 and there is assembly insertion indicia 32 on an outside surface 33 of the first outlet box section 11. The indicia consists of width measurements compatible with the various sizes of sheetrock panels that may be used. This aids the user to properly mount the box assembly in the wall 102 so that the outlet socket 103 and the cover plate 104 may be mounted properly. The wire clamping members slide in a notch cut in the top and bottom walls of the second outlet box sections. There are little tabs on the sliding sections to retain and guide them in the slots.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. An electrical outlet box assembly comprising:
   (a) a first outlet box section;
   (b) a second outlet box section integrally connected to the first outlet box section;
   (c) the first outlet box section comprising:
      a first outlet top wall;
      a first outlet bottom wall; and
      a pair of opposing first outlet side walls connecting the first outlet top wall and the first outlet bottom wall;
   (d) the second outlet box section comprising:
      a second outlet top wall;
      a second outlet bottom wall; and
      a pair of opposing second outlet side walls connecting the second outlet top wall and the second outlet bottom wall;
      a forward end of the second outlet box section having a height less than the height of a rearward end of the second outlet box section;
   (e) a wire port in the second outlet top wall of the second outlet box section; and
   (f) a wire clamping member comprising:
      a first section slidingly connected to the second outlet top wall of the second outlet box section and partially sliding over the wire port;
      a second section connected to the second outlet top wall of the second outlet box section and opposing the first section; and
      a means to move the first section toward the second section and releasably secure a wire between the first section and the second section.

2. An electrical outlet box assembly as described in claim 1 further comprising a mounting member attached to the second outlet section.

3. An electrical outlet box assembly comprising:
   (a) a first outlet box section; and
   (b) a second outlet box section integrally connected to the first outlet box section;
   (c) the first outlet box section comprising:
      a first outlet top wall;
      a first outlet bottom wall; and
      a pair of opposing first outlet side walls connecting the first outlet top wall and the first outlet bottom wall;
   (d) the second outlet box section comprising:
      a second outlet top wall;
      a second outlet bottom wall; and
      a pair of opposing second outlet side walls connecting the second outlet top wall and the second outlet bottom wall; and
      a forward end of the second outlet box section having a height less than the height of a rearward end of one second outlet box section;
   (e) a mounting member attached to the second outlet section;
   (f) a wire port in the second outlet top wall of the second outlet box section;

(g) a wire clamping member comprising:
- a first section slidingly connected to the second outlet top wall of the second outlet box section and partially sliding over the wire port;
- a second section connected to the second outlet top wall of the second outlet box section and opposing the first section; and
- a means to move the first box section toward the second section and releasably secure a wire between the first section and the second section;

a grounding member in the second outlet box section; and (i) assembly insertion indicia on an outside surface of the first outlet box section.

4. An electrical outlet box assembly comprising:

(a) a first outlet box section; and a second outlet box section integrally connected to the first outlet box section;

(c) the first outlet box section comprising:
- a first outlet top wall;
- a first outlet bottom wall; and
- a pair of opposing first outlet side walls connecting the first outlet top wall and the first outlet bottom wall;

(d) the second outlet box section comprising:
- a second outlet top wall;
- a second outlet bottom wall; and
- a pair of opposing second outlet side walls connecting the second outlet top wall and the second outlet bottom wall; and
- a forward end of the second outlet box section having a height less than the height of a rearward end of the second outlet box section;

(e) a mounting member attached to the second outlet box section;

a first wire port in the second outlet top wall of the second outlet box section;

(g) a second wire port in the second outlet bottom wall of the second outlet box section;

(h) a first wire clamping member comprising:
- a first section slidingly connected to the second outlet top wall of the second outlet box section and partially sliding over the first wire port;
- a second section connected to the second outlet top wall of the second outlet box section and opposing the first section; and
- a means to move the first section toward the second section and releasably secure a wire between the first section and the second section;

(i) a second wire clamping member comprising:
- a first section slidingly connected to the second outlet bottom wall of the second outlet box section and partially sliding over the second wire port;
- a second section connected to the second outlet bottom wall of the second outlet box section and opposing the first section; and
- a means to move the first section toward the second section and releasably secure another wire between the first section and the second section;

(j) a grounding member in the second outlet box section; and (k) assembly insertion indicia on an outside surface of the first outlet box section.

* * * * *